(12) United States Patent
Rissik

(10) Patent No.: US 7,654,582 B2
(45) Date of Patent: Feb. 2, 2010

(54) DIRECTIONAL CONTROL OF AN AUTOMATIC POOL CLEANER

(75) Inventor: George Victor Rissik, Gauteng Province (ZA)

(73) Assignee: Arengo 309 (Proprietary) Limited, Guateng (ZA)

( * ) Notice: Subject to any disclaimer, the term of this patent is extended or adjusted under 35 U.S.C. 154(b) by 0 days.

(21) Appl. No.: 10/539,059

(22) PCT Filed: Dec. 16, 2003

(86) PCT No.: PCT/IB03/05918

§ 371 (c)(1),
(2), (4) Date: Jan. 30, 2006

(87) PCT Pub. No.: WO2004/055300

PCT Pub. Date: Jul. 1, 2004

(65) Prior Publication Data

US 2006/0157973 A1      Jul. 20, 2006

(30) Foreign Application Priority Data

Dec. 17, 2002    (ZA)    ................... 2002/5038

(51) Int. Cl.
  *F16L 43/00*    (2006.01)
  *F16L 27/00*    (2006.01)
(52) U.S. Cl. ............... 285/179; 285/275; 285/276; 285/278
(58) Field of Classification Search .......... 285/179, 285/127.1, 272, 275, 276, 278
  See application file for complete search history.

(56) References Cited

U.S. PATENT DOCUMENTS

| | | | | | |
|---|---|---|---|---|---|
| 1,961,198 | A | * | 6/1934 | Corley | 285/127.1 |
| 2,269,431 | A | * | 1/1942 | Allen et al. | 285/276 |
| 2,501,639 | A | * | 3/1950 | Warren | 285/147.2 |
| 2,509,119 | A | * | 5/1950 | Warren | 285/147.1 |
| 2,514,417 | A | * | 7/1950 | Roofe | 285/276 |
| 2,574,625 | A | * | 11/1951 | Coss | 29/443 |
| 2,731,234 | A | * | 1/1956 | Bily | 175/216 |
| 2,746,773 | A | * | 5/1956 | Bily | 285/117 |
| 3,288,496 | A | * | 11/1966 | Myers | 285/94 |
| 3,552,778 | A | * | 1/1971 | Muller | 285/94 |
| 3,900,221 | A | * | 8/1975 | Fouts | 285/276 |
| 4,099,744 | A | * | 7/1978 | Kutnyak et al. | 285/7 |
| 4,558,889 | A | * | 12/1985 | Gans | 285/7 |
| 4,747,621 | A | * | 5/1988 | Gans et al. | 285/7 |
| 4,893,845 | A | * | 1/1990 | Bartholomew | 285/124.4 |
| 4,998,755 | A | * | 3/1991 | Reeder | 285/181 |
| 5,551,734 | A | * | 9/1996 | Sulzyc et al. | 285/148.15 |
| 6,447,017 | B1 | * | 9/2002 | Gilbreath et al. | 285/89 |
| 2004/0046386 | A1 | * | 3/2004 | Chien et al. | 285/276 |

FOREIGN PATENT DOCUMENTS

EP    0 745 744    12/1966

* cited by examiner

*Primary Examiner*—James M Hewitt
(74) *Attorney, Agent, or Firm*—Bacon & Thomas, PLLC

(57) ABSTRACT

A direction control means for apparatuses for cleaning submerged surfaces in the form of an elbow joint with swivel connections at each end. The connections may include anti-friction surfaces.

4 Claims, 1 Drawing Sheet

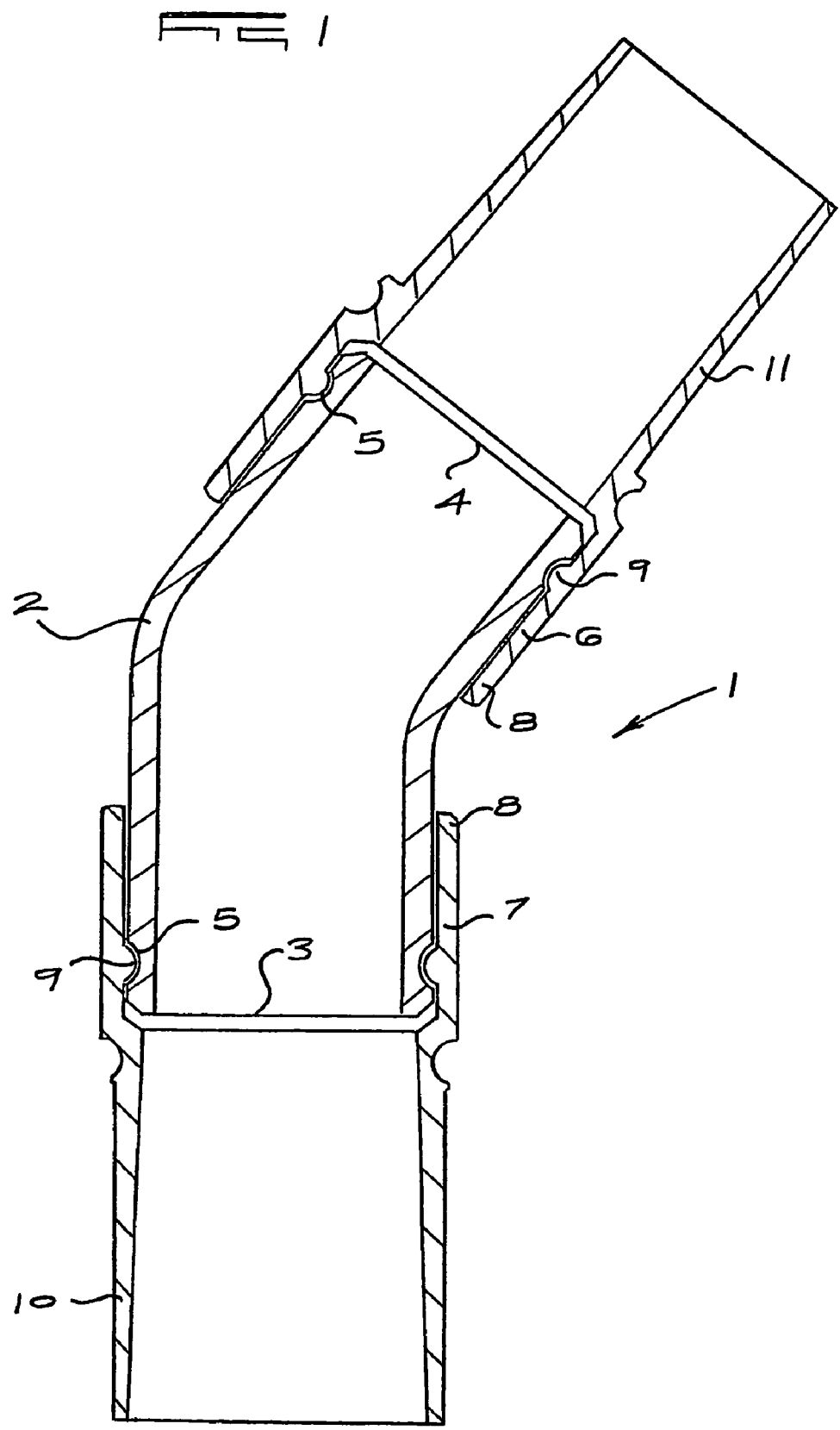

DIRECTIONAL CONTROL OF AN AUTOMATIC POOL CLEANER

FIELD OF THE INVENTION

This invention relates to means for controlling the directional movement of automatic pool cleaners operating to clean submerged surfaces.

BACKGROUND TO THE INVENTION

Suction operated swimming pool cleaning devices are now well known. These pool cleaners are connected through a suction hose to the connection from the pool to the filtration plant. Many of these pool cleaners do not work satisfactorily in aboveground pools or in-ground pools having the bottom and sidewalls of the pool meeting at substantially right angles. The cleaners tend strongly to remain stationary in corners or alternatively to follow the join between bottom and sidewall of the pools. This problem can be overcome in some small measure by switching the pump motor off and on. This is not a satisfactory solution in that the directional control is insufficient to result in effective cleaning and the operation of the pool cleaner is no longer automatic.

OBJECT OF THE INVENTION

It is an object of this invention to provide a simple means for directional control of a suction pool cleaner while in motion to mitigate the above problem.

SUMMARY OF THE INVENTION

In accordance with this invention there is provided a directional control means for a submerged surface suction cleaning apparatus comprising an elbow joint for insertion between a cleaning apparatus and a flexible hose characterized in that each end of the elbow includes a swivel connection.

Further features of the invention provide for the components of the swivel connection to include anti-friction contact surfaces and for the angular connection between the ends of the elbow joint to be between 135° and 165° degrees, preferably about 150°.

The invention also provides for the inlet and outlet ends of the elbow joint to provide friction spigot or socket or one spigot and one socket connections.

BRIEF DESCRIPTION OF THE DRAWINGS

These and other features of this invention will become apparent from the following description of a preferred embodiment in which reference is made to the accompanying drawing in which FIG. 1 shows a longitudinal cross section through the elbow joint.

DETAILED DESCRIPTION OF THE INVENTION

As illustrated the elbow joint (1) is suitable for connection between a swimming pool cleaner outlet and the inlet to a suction hose. Neither of these is shown and can be of any suitable known type.

The joint (1) comprises three components, an elbow (2), an inlet (3) and an outlet (4). These components (2), (3) and (4) will be moulded from suitable plastics material having a necessary degree of resilience to enable connection between the components to be snap fits.

Adjacent each end of the elbow (2) is a peripheral groove (5) and the set of the elbow ensures that the ends are inclined to each other at between 135° and 165°, preferably at 150°.

These ends of the elbow (2) form male components of swivel connections.

Each female component (6) and (7) has a cuff (8) to fit over an elbow end. Each cuff (8) has an internal circumferential rib (9) sized to engage by a snap fit into the appropriate groove (5) of an elbow and when the end is introduced into the cuff (8).

The surfaces of the grooves (5) and ribs (9) are made to afford anti-friction characteristics between the components. This is because in use the joints are subjected to compressive force due to the suction applied through the joint.

It will be appreciated that if there are friction-affording surfaces between these components the desired swiveling effect of the joint will be lost.

The anti-friction effect can be obtained by making one or both of the contacting components from material having an inherent anti-friction characteristic and that the materials can be the same or different.

Special anti-friction bearings can be fitted between the components if necessary.

Extending from the end of each female component (6) and (7) opposite the cuff (8) is an extension (10) or (11). These extensions (10) or (11) are provided so that the elbow joint (1) can be fitted between the suction hose and the pool cleaner with which the elbow is to be used.

As illustrated extension (10) is formed as a socket to engage over the outlet of the swimming pool cleaner and extension (11) as a spigot to connect into the end of a suction hose. These sockets and spigots can be chosen to meet particular requirements and will be friction fits on their mating components.

In use the elbow joint will provide a free swiveling action between the pool cleaner and the suction hose. This in turn ensures that the forces applied on the pool cleaner during its working cycle will always be such that it can release itself from any restraint placed on its movement. The swivel connections provide 360° of relative rotation with respect to the pool cleaner body which is usually inclined to the surface to be cleaned. This in turn ensures that the pool cleaner will move at an ever-changing angle to the flexible hose and thus achieve a completely random pattern.

While the embodiment above has been directed to swimming pool cleaners it will be appreciated that the invention can be applied to other equipment used for the automatic cleaning of submerged surfaces.

The invention claimed is:

1. A directional control means for submerged surface suction cleaning apparatus comprising:
   an elbow joint terminating in an inlet end and an outlet end, the inlet and outlet ends being inclined relative to each other and defining a peripheral groove adjacent the ends;
   a first extension comprising a cuff fitted over the inlet end of the elbow joint, the cuff comprising a peripheral rib configured to engage the peripheral groove adjacent the end of the inlet end in a snap fit, so as to allow the first extension to swivel relative to the elbow joint, the first extension terminating in a protruding socket to engage an outlet of a cleaning apparatus; and
   a second extension comprising a cuff fitted over the outlet end of the elbow joint, the second extension comprising a peripheral rib configured to engage the peripheral groove adjacent the end of the outlet end in a snap fit, so as to allow the second extension to swivel relative to the elbow joint, the second extension terminating in a protruding spigot for insertion into a suction hose.

2. A directional control means as claimed in claim 1 characterised in that the inlet end and the outlet end are inclined to each other at between 135° and 165°.

3. A directional control means as claimed in claim 2 characterised in that the inlet end and the outlet end are inclined to each other at 150°.

4. A directional control means as claimed in claim 1 characterised in that the peripheral rib and the peripheral groove are formed with anti-friction surfaces.

* * * * *